March 12, 1935.  J. W. DAWSON  1,994,336

VALVE BONNET

Filed May 20, 1929  2 Sheets-Sheet 1

Inventor:
James W. Dawson
by Dyrenforth, Lee, Chritton & Wiles,
Attys

March 12, 1935.   J. W. DAWSON   1,994,336
VALVE BONNET
Filed May 20, 1929   2 Sheets-Sheet 2
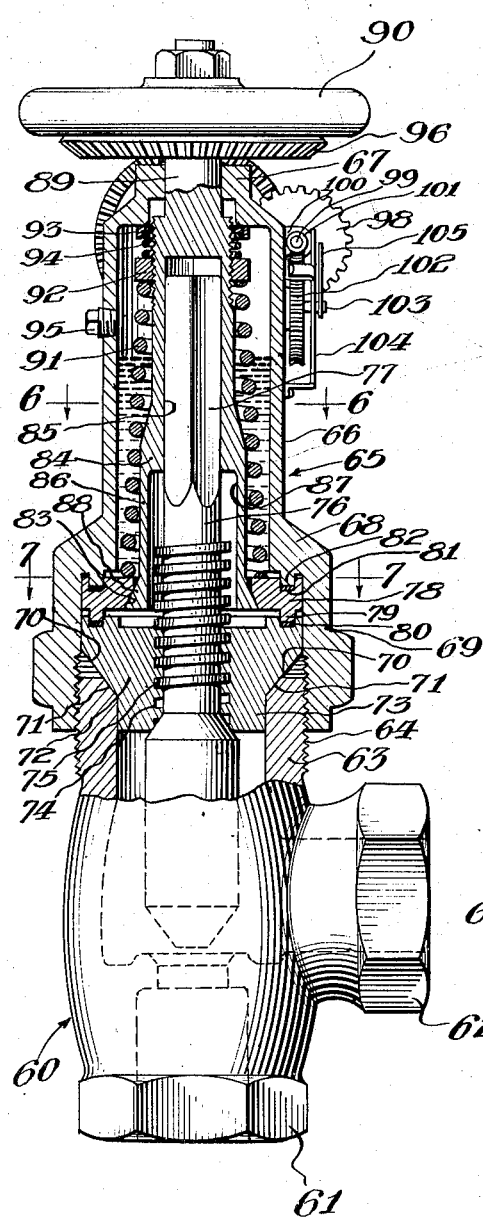
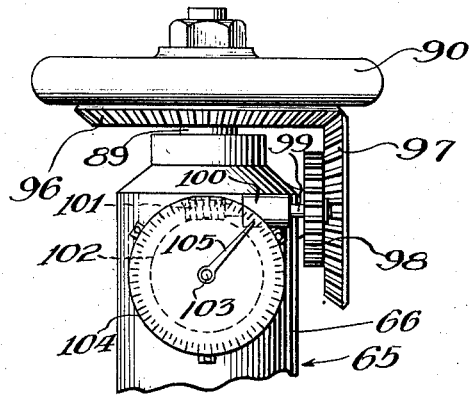
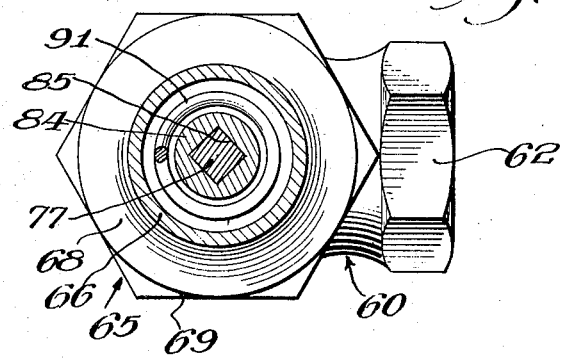
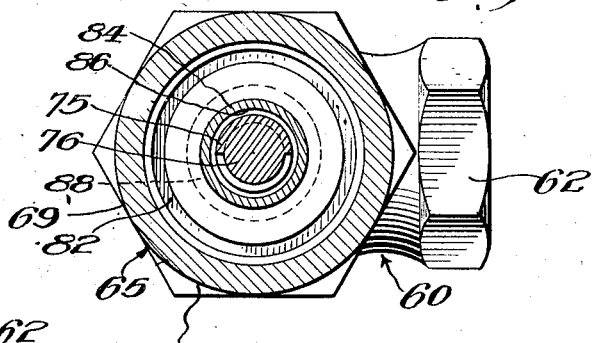
Inventor:
James W. Dawson,
By Dyrenforth, Lee, Chritton & Wiles,
 Attorneys.

Patented Mar. 12, 1935

1,994,336

UNITED STATES PATENT OFFICE 1,994,336

VALVE BONNET

James W. Dawson, Chicago, Ill.

Application May 20, 1929, Serial No. 364,589

10 Claims. (Cl. 251—47)

This invention relates particularly to a valve embodying an improved bonnet; and the primary object is to provide an improved bonnet which obviates the necessity of employing a packing or gland between the valve-operating stem and the valve body.

A further object is to provide a valve bonnet which can be applied readily to any of the existing types of valves without materially altering the structure of the valve.

Another object is to provide a valve bonnet which is adapted to supply lubricant from time to time to the valve.

The invention is illustrated in its preferred embodiments in the accompanying drawings, in which:—

Fig. 5 is a vertical sectional view of a modified form of the improved valve bonnet, only a portion of the valve to which the bonnet is attached being shown in section.

Fig. 6 is a transverse sectional view taken as indicated at line 6 of Fig. 5.

Fig. 7 is a transverse sectional view taken as indicated at line 7 of Fig. 5.

Fig. 8 is a fragmentary elevational view of the upper portion of the bonnet showing in detail an indicating device which may be employed.

Figure 1:
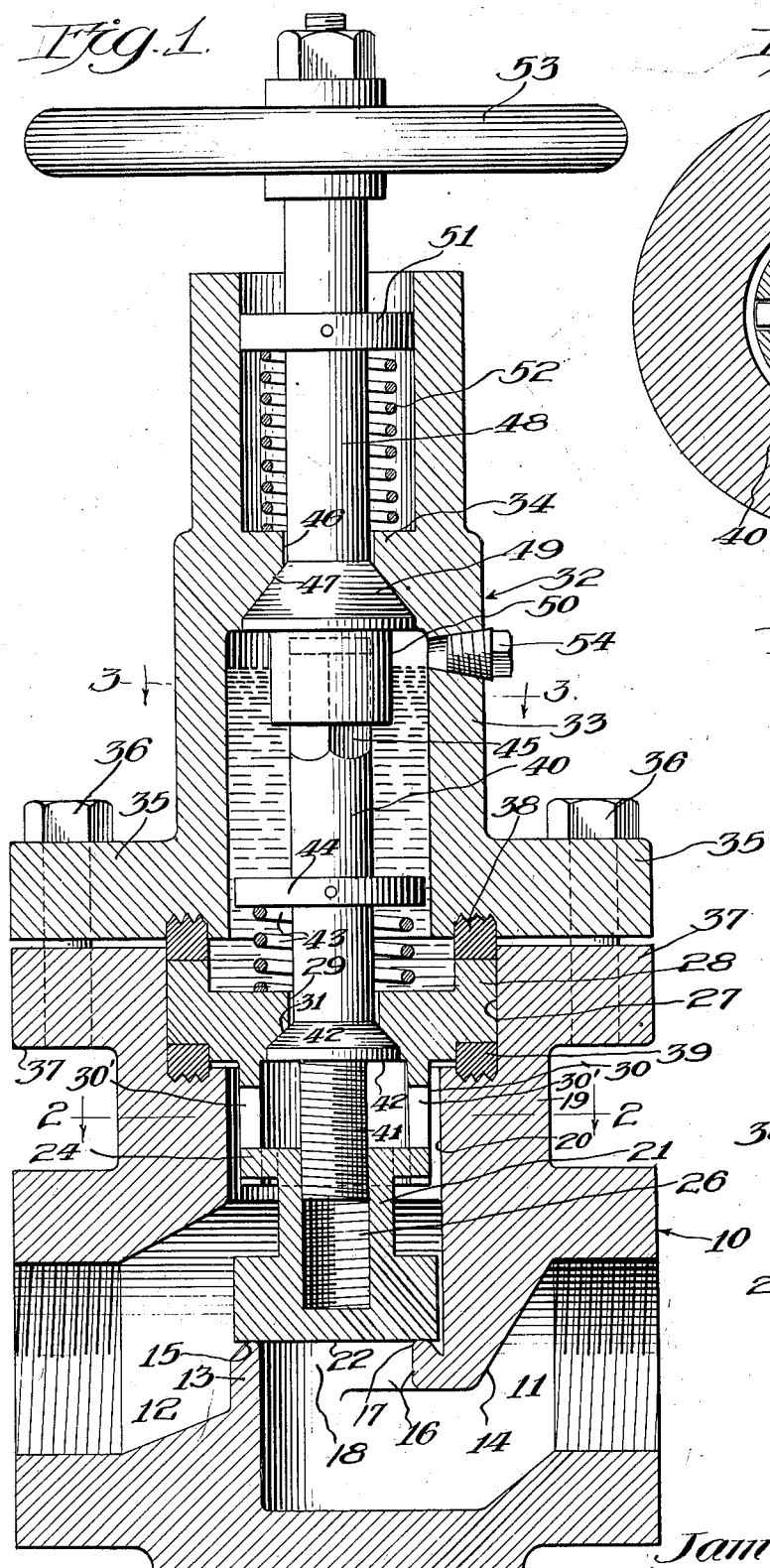
Figure 1 is a vertical sectional view of the improved bonnet applied to a valve.
Figure 2:
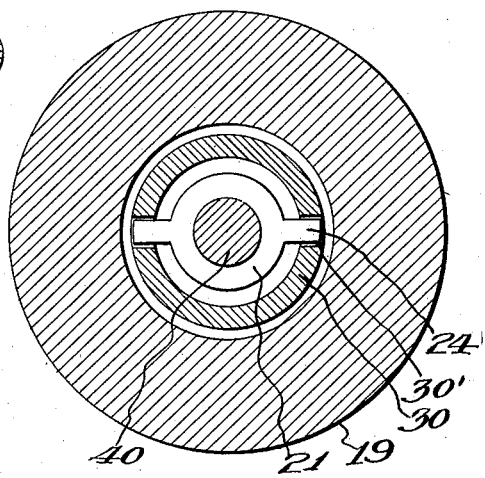
Fig. 2 is a transverse sectional view taken as indicated at line 2 of Fig. 1.
Figure 3:
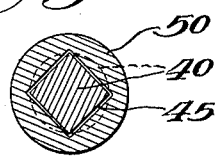
Fig. 3 is a transverse sectional view of the valve stem and socket carried by the valve operating shaft, taken as indicated at line 3 of Fig. 1.

In the embodiment illustrated in Figs. 1 to 4, inclusive, 10 designates a valve casing which is provided with an inlet conduit 11 and an outlet conduit 12, both of which are provided with threads or other suitable means for connecting them to pipe-lines. These conduits 11 and 12 are separated by a pair of semi-circular walls 13 and 14 formed integrally with the valve body 10. The wall 13 projects upwardly and has its upper edge formed to provide a suitable valve seat 15, while the wall 14 extends downwardly and is provided along its lower edge with an inwardly projecting and upwardly turned flange 16, the upper edge 17 of which is disposed in the same horizontal plane as the edge 15 of the wall 13. The upper edge 17 is adapted to provide a valve seat similar to the valve seat 15. The flange 16 and the wall 13 are each semi-circular and are integrally formed together whereby a conduit 18 is formed which communicates with inlet port 11 and the outlet port 12.

The valve casing 10 is provided with an upwardly extending cylindrical portion 19 provided with a central vertical bore 20 within which is disposed a vertically slidable valve 21, the bottom face 22 of which is adapted to seat against the seat-like edges 15 and 17 of the walls 13 and 14, respectively, whereby the conduit 18 which communicates with ports 11 and 12 may be closed off. The valve 21 is provided with a vertically disposed threaded bore 26 terminating short of the bottom wall 22, the purpose of which will be hereinafter more particularly apparent.

The upper end of the cylindrical portion 19 is provided with an enlarged counter-bore 27 which receives a circular plate or position 28. The plate 28 serves as a top plate or closure for the cylindrical portion 19 of the valve casing. The plate 28 is provided with a central bore 29 and a cylindrical hub 30 which projects downwardly into the bore 20 of the cylindrical portion 19. The lower portion of the bore 29 of the plate 28 is flared out to provide a sloping annular valve seat 31. The cylindrical hub 30 is provided with one or more vertical slots 30' which engage one or more lugs 24 extending from the upper portion of the valve 21. This structure permits the valve 21 to slide freely up and down within the bore 20, but prevents the valve 21 from rotating therein.

The valve bonnet is designated as a whole at 32; and comprises a cylindrical member 33 provided with an intermediate transverse wall 34 and a horizontal outwardly extending annular flange 35 adjacent its lower end. The lower end of the bonnet 32 is mounted upon the upper end of the cylindrical portion 19 of the valve casing 10, being secured thereto by means of cap-screws 36, which pass through suitable apertures in the flange 35 of the bonnet and engage suitably threaded apertures in a similar annular flange 37 provided upon the upper end of the cylindrical portion 19 of the valve body 10.

An annular gasket 38 is positioned between the lower end of the bonnet 32 and the circular plate 28, while a similar gasket 39 is placed between the lower face of the circular plate 28 and the shoulder or offset at the lower end of the counter-bore 27. These gaskets are preferably of the type suitable for high pressure, being constructed of lead, fibre, or the like. By means of the foregoing structure, the bonnet 32, the circular plate 28 and the valve casing 10 all are secured together in a unitary and leak-proof structure.

The valve 21 is operated by means of a valve-stem 40 which passes through the bore 29 in the circular plate or partition 28 and has its lower end provided with threads 41 adapted to engage the threads within the bore 26 in the valve 21. The valve stem 40 is provided with a frustro-conical auxiliary poppet valve 42 which is disposed directly above the threads 41 and is adapted to seat in the annular valve seat 31 provided in the circular plate 28. It is to be noted that the diameter of the valve stem 40 is slightly less than the diameter of the bore 29 in the plate 28. A coil spring 43 is confined between the upper face of the plate 28 and a metal washer 44 which is secured to the valve stem 40, whereby the valve stem 40 is forced upwardly and the poppet valve 42 maintained in engagement with the seat 31 in the plate 28. The upper portion of the valve stem 40 projects into the bonnet 32 and terminates short of the intermediate wall 34. The upper end of the valve stem 40 is squared or faceted, as shown at 45.

The valve stem 40 is operated by means of the following structure. The transverse partition wall 34 is provided with a central bore 46, the lower portion of which is flared outwardly to form a sloping annular seat 47. A shaft 48 is journaled in the bore 46 of the partition 34. The shaft 48 has its lower end provided with a frustro-conical sealing member 49 adapted to seat in the seat 47. A socket 50 is disposed below the sealing member 49 and provided with a square aperture adapted to engage the squared end 45 of the valve stem 40. The stem 40 and the shaft 48 constitute a sectional valve stem. The upper portion of the shaft 48 has secured to it an annular disk or washer 51 which is of a diameter slightly less than the diameter of the upper portion of the interior of the cylindrical bonnet 32. The disk 51 thus provides a means for journalling the upper portion of the shaft 48. Between the disk 51 and the upper surface of the partition wall 34 is a coil-spring 52 which serves to force the shaft 48 upwardly and thus maintain the sealing member 49 in close fitting contact with the seat 47. The upper end of the shaft 48 has secured to it a hand-wheel 53, by means of which the shaft 48 may be manually rotated.

As shown in the drawings, the lower portion of the bonnet 32 may be provided with an aperture closed by a removable plug 54, through which aperture oil or other lubricant may be introduced into the bonnet, so that when the valve stem 40 is forced downwardly and the valve 42 moved from its seat 31 as hereinafter explained, the oil will flow past the valve 42 and into the valve chamber. Thus the threads 41 and the valve 21 may be suitably lubricated.

Figure 4:
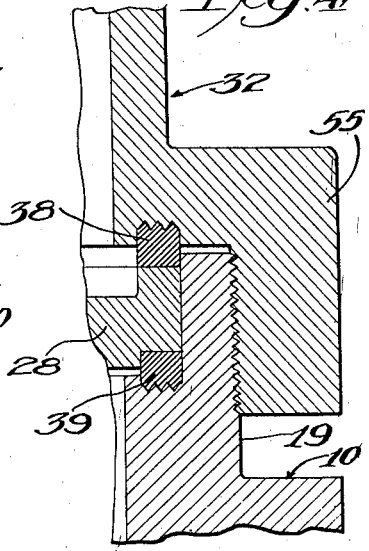
Fig. 4 is a fragmentary vertical sectional view showing the bonnet secured to the valve by a threaded connection instead of the cap screws illustrated in Fig. 1.

Fig. 4 illustrates a slightly different way of securing the bonnet 32 to the valve casing 10. Instead of securing the bonnet 32 to the valve casing 10 by means of the cap screws 36, illustrated in Fig. 1, the bonnet 32 may be provided with a downwardly extending annular flange 55, the inner surface of which is provided with threads adapted to engage threads formed upon the cylindrical portion 19 of the valve casing 10.

The operation of the device illustrated in Figs. 1 to 4, inclusive, will be readily understood. The valve 21 is moved toward or away from its seat by manually turning the hand-wheel 53 which rotates the shaft 48 and the valve stem 40, the threads 41 moving the valve 21 upwardly or downwardly, depending upon the direction of rotation.

The poppet valve 42 is normally maintained in its seat by the spring 43 and provides a seal between the interior of the valve casing 10 and the cylindrical chamber 33, thus obviating the necessity of employing any packing or gland between the valve casing and the valve stem. When the valve 21 is spaced from its seat, the hand-wheel 53 may be forced downwardly to move downwardly the shaft 48, and the stem 40, causing the valve 42 to move from its seat and permit oil to flow past it into the casing 10 whereby the valve 21 and the threads 41 are lubricated. The sealing member 49 on the shaft 48 functions to seal the upper end of the oil chamber and at the same time serves as an auxiliary sealing member in the event of any failure on the part of the valve 42. The valve shaft 48 and valve stem are thus longitudinally movable relative to the valve casing 10.

In the embodiment illustrated in Figs. 5 to 7, inclusive, 60 designates the casing of a valve, which is provided with a pair of threaded bosses 61 and 62 into which the pipe sections are screwed. The valve may be of any of the well known types, such as a gate-valve, a globe valve, et cetera. The upper portion of the casing 60 is provided with an upwardly extending cylindrical portion 63 which is provided with threads 64.

The valve bonnet is designated as a whole at 65 and comprises a cylindrical member 66 provided at its upper end with a wall 67. The lower end of the cylindrical member 66 is offset outwardly, as indicated at 68, to form an enlarged cylindrical portion 69, the interior of which is provided with suitable threads for engaging the threads 64 on the cylindrical portion 63, whereby the bonnet 65 may be firmly secured to the valve casing 60.

The upper end of the cylindrical portion 63 is reamed out to provide a beveled seat 70 which engages with a leakproof fit, the sloping walls 71 of a top plate member 72. The top plate member 72 forms a closure for the upper end of the cylindrical portion 63 and is provided with a downwardly protruding hub 73 which extends into the cylindrical portion 63 engaging the inner wall thereof with a close sliding fit. The plate 72 has a centrally disposed bore 74 provided with threads which engage the threaded portion 75 of a valve stem 76. The upper portion of the valve stem 76 extends into the interior of the bonnet 65, while its lower portion extends into the valve casing 60. The valve which is in the casing 60 may be formed upon, or secured to, the lower end of the valve stem 76. The upper portion of the valve stem 76 is squared or faceted, as shown at 77. A circular partition plate 78 is superposed upon the top plate 72, and is preferably of a diameter slightly smaller than the internal diameter of the enlarged cylindrical portion 69 of the bonnet 65. The lower face of the circular plate 78 is provided with an annular rib 79 which engages a gasket 80 fitted in an annular groove formed in the upper face of the top plate member 72. The upper face of the circular plate 78 is provided with an annular groove into which is fitted a gasket 81, the latter engaging an annular rib 82 formed on the interior of the offset 68 of the bonnet 65. It is to be noted that the rib 79 projects a sufficient distance below the partition plate 78 to cause the latter to be spaced from the top plate 72.

The valve stem 76 may be operated by means of the following structure. The partition plate 78 is provided with a central aperture 83, the walls of which are sloped to form an annular valve seat. A hollow sleeve 84 is mounted within the bonnet 65, its upper portion being provided with a square bore 85 into which projects the squared portion 77 of the valve stem 76. The lower portion 86 of the sleeve 84 is of a greater diameter than the upper portion and is provided with a counter bore 87 which communicates with the square bore 85.

The lower end of the sleeve 84 is journaled in the annular valve seat 83, in the partition plate 78, the outer wall of the lower end being flared outwardly and downwardly to provide a frusto-conical auxiliary valve 88 adapted to be seated in the valve seat 83, in the partition plate 78. The upper end of the sleeve 84 is provided with a shaft 89 which is journaled in an aperture provided in the upper end wall 67 of the bonnet 65. The shaft 89 extends above the end wall 67 and has mounted upon it a suitable hand-wheel 90. By means of this structure the sleeve 84 and valve stem 76 may be manually rotated, the latter being moved upwardly or downwardly by the threads 75. The sleeve 84 thus constitutes a part of the valve stem and is extensible and retractable relative to the valve casing 60. It is to be noted that the diameter of the lower portion 86 of the sleeve 84 is slightly less than the smallest diameter of the valve seat aperture 83 in the partition plate 78.

A coil spring 91 surrounds the sleeve 84, being confined between the upper face of the partition plate 78 and a circular disk 92 threaded upon the upper portion of the sleeve 84. The coil spring 91 thus forces the sleeve 84 upwardly to maintain the poppet valve 88 engaged with the valve seat 83. A leather cup or washer 93 is carried on the upper end of the sleeve 84 to provide a seal between the sleeve 84 and the top wall 67 of the bonnet 65. The cup 93 may be maintained in close fitting contact with the upper end wall 67 by means of a coil spring 94 which is disposed between the cup 93 and the top face of the disk 92.

As shown in Fig. 5, the upper portion of the bonnet 65 may be provided with an aperture, closed by a removable plug 95, through which aperture oil or other lubricant may be introduced into the bonnet 65 so that when the sleeve 84 is forced downwardly and the valve 88 thereby moved from its seat 83, the oil will flow past the valve 88 and upon the threads 75 of the valve stem 76.

The operation of the device illustrated in Figs. 5 to 8, inclusive, will be readily understood. The valve carried upon the lower end of the valve stem 76 is moved toward or away from its seat by manually turning the hand-wheel 90, which rotates the sleeve 84 and the valve stem 76, the threads 75 moving the stem 76 upwardly or downwardly, in a well known manner of operation, depending upon the direction of rotation. The poppet valve 88 is normally maintained in its seat 83 by the spring 91 and provides a seal between the valve casing 60 and the sleeve 84, thus avoiding the necessity of employing any packing or gland between the valve casing and the valve stem 76, or the sleeve 84. When it is desired to pass oil from the interior of the bonnet through the partition plate 78, the hand-wheel 90 may be forced downwardly to move the sleeve 84 downwardly, causing the poppet valve 88 to move from its seat 83.

When either of the above described bonnets is employed with regulating valves or expansion valves, etc., it will be found desirable to employ some means for indicating to what degree the valves are opened. In Figs. 5 and 8, I have illustrated such an indicating device which may be constructed as follows. The underside of the hand-wheel 90 is provided with a large beveled gear 96 which meshes with a vertically disposed gear 97 suitably journaled upon the bonnet 65. The inner face of the gear 97 has secured to it a small spur gear (not shown) which engages with a large gear 98 secured to a shaft 99 journaled in a bearing 100 on the bonnet 65. The shaft 99 carries a worm 101 which engages a worm gear 102 secured to a shaft 103, the shaft 103 being suitably journaled upon the bonnet 65. The outer end of the shaft 103 projects through a central aperture of a circular dial 104 and carries an indicating hand 105. The operation of this indicating mechanism is obvious from the foregoing description. It will be found desirable to provide sufficient play between the gears 96 and 97 to permit the hand-wheel 90 to be moved downwardly when it is desired to open the valve 88.

The foregoing detailed description has been given for clearness of understanding only and no unnecessary limitations should be understood therefrom, but the appended claims should be construed as broadly as permissible, in view of the prior art.

What I regard as new, and desire to secure by Letters Patent, is:

1. A valve comprising a hollow casing having a hollow bonnet adapted to contain a lubricant secured thereto and communicating with the interior of said casing, a main valve disposed within said casing, a stem for operating said main valve mounted in said bonnet and projecting into said casing, said stem being mounted for independent rotating and reciprocating movement relative to said bonnet and said casing, said main valve being moved to open or closed position upon the rotation of said stem, and an auxiliary valve associated with said valve operating stem for closing communication between said bonnet and said casing, said auxiliary valve being moved to open position upon said valve operating stem being reciprocated toward said casing.

2. A valve comprising a hollow casing provided with a hollow bonnet secured thereto, said bonnet being adapted to contain a lubricant, a main valve disposed within said casing, a partition member disposed between said bonnet and said casing and provided with an aperture communicating with the interior of said bonnet and said casing, whereby lubricant may flow from said bonnet into said casing, a valve stem disposed in said bonnet and projecting through said aperture for actuating said main valve, said valve stem being mounted for independent rotating and reciprocating movement relative to said casing, and an auxiliary valve associated with said valve operating stem for closing said aperture, said auxiliary valve being movable to open position only upon said valve operating stem being reciprocated in a direction toward said casing.

3. A valve comprising a hollow casing provided with an upwardly protruding hollow bonnet, a partition plate carried between said bonnet and said casing, said partition plate being provided with an aperture communicating with the interior of the casing and the bonnet, said aperture having a downwardly and outwardly flaring circular valve seat formed therein, a valve stem within said bonnet having its lower portion extending through the aperture in said partition plate and into said casing, said valve stem being mounted for independent rotatable and longitudinal vertical movement relative to said partition, a main valve within said casing and movable to open or closed position upon the rotation of said valve stem, and a downwardly and outwardly flaring frusto-conical auxiliary valve carried by the lower portion of said valve stem and coacting with the seat in the aperture in said partition, said auxiliary valve being disengaged from said seat when said stem is moved downwardly relative to said partition, thereby establishing communication between said bonnet and said valve casing.

4. A valve comprising a casing provided with a main valve, a rotatable reciprocatory valve stem protruding from said casing, said main valve being movable to open or closed position upon the rotation and reciprocation of said valve stem, a hollow bonnet secured to said casing and having its end adjacent the valve casing provided with an opening, said bonnet surrounding the protruding end of said valve stem, a sleeve mounted for rotatable and longitudinal movement relative to said casing and provided with a bore engaging the protruding end of said valve stem in a slidable, non-rotatable manner, and an auxiliary valve for closing the said opening in the said end of the bonnet, said auxiliary valve being movable to open position upon said sleeve being moved longitudinally in a direction toward said casing.

5. A valve comprising a casing provided with a main valve, a rotatable reciprocatory valve stem protruding from said casing, said main valve being movable to open or closed position upon the rotation and reciprocation of said valve stem, a hollow bonnet secured to said casing, the end of said bonnet adjacent the casing being provided with an aperture, said bonnet surrounding the protruding end of said valve stem, a sleeve within said bonnet mounted for rotatable and longitudinal movement relative to said casing and provided with a bore, engaging the protruding end of said valve stem in a slidable, non-rotatable manner, an auxiliary valve for closing the said aperture in the end of said bonnet, said auxiliary valve being movable to open position upon said sleeve being moved longitudinally in a direction toward said casing, and spring means for maintaining said auxiliary valve in closed position.

6. A valve comprising a casing provided with a main valve, a rotatable reciprocatory valve stem protruding from said casing, said main valve being opened or closed upon rotation and reciprocation of said valve stem, a hollow bonnet secured to said casing and surrounding the protruding end of said valve stem, a sleeve mounted within said bonnet for rotatable and longitudinal movement relative to said casing, said sleeve being provided with a bore engaging the protruding end of said valve stem in a slidable and non-rotatable manner, a plate disposed between said bonnet and said casing provided with an aperture communicating with the interior of said bonnet, and an auxiliary valve associated with said sleeve for closing said aperture, said auxiliary valve being movable to open position upon said sleeve being moved longitudinally in a direction toward said casing.

7. A valve comprising a casing provided with a valve, a stem for operating said valve extending outwardly through a wall of said casing, a hollow chamber exterior of said casing and surrounding said stem, said chamber being adapted to contain lubricant fluid, said stem having means cooperative with said chamber operable to establish and discontinue communication between the interiors of said casing and said hollow chamber, whereby predetermined quantities of lubricant can be fed from said hollow chamber.

8. A valve comprising a casing provided with a valve, a hollow chamber exterior of said casing, a sectional stem the sections of which are telescopically mounted for operating said valve extending outwardly through a wall of said casing, said stem passing through a wall of said chamber and extending there-beyond, said stem comprising means operable by movement of said stem to establish and discontinue communication between the interiors of said casing and said hollow chamber, and means on one stem section for effecting a leak-proof seal between said valve stem and the said wall of the chamber.

9. A valve comprising a casing provided with a valve, a rotatable valve stem protruding from a side of said casing, said valve being opened or closed upon rotation of said valve stem, a hollow bonnet secured to said side of said casing and surrounding the protruding end of said valve stem, a transverse partition wall in said bonnet, a second transverse partition wall adjacent the end of the valve casing, each of said partitions being provided with an aperture, a shaft journaled in the aperture in the first mentioned partition for independent rotatable and longitudinal movement relative to said partition and having its lower end projecting through said aperture to a point beyond said partition, said shaft being coupled to said valve stem in a slidable, non-rotatable manner, a sealing member carried by the lower end of said shaft and adapted to engage the lower side of the aperture in said first mentioned partition wall to provide a leak-proof seal between said partition wall and the shaft, said sealing member being movable away from said side of the aperture upon said shaft being moved in a longitudinal downward direction relative to said partition, said valve stem passing freely through the aperture in the second mentioned partition and means for normally effecting a leak-proof seal between said valve stem and said second partition and movable away from said partition to open communication between the valve casing and bonnet on downward movement of said shaft.

10. In a valve device, a casing provided with a main valve, a hollow bonnet secured to said casing and provided with a lubricant containing chamber having a top wall provided with an aperture, a partition between said lubricant chamber and said casing provided with an aperture communicating with the interior of said casing and said lubricant chamber and defining a valve seat, a sectional rotatable valve stem journaled in both of said apertures having its inner end extending through the aperture in said partition and into said casing for operating said main valve, said stem being adapted for independent rotatable and reciprocable movement relative to said casing, an auxiliary valve carried by one section of said stem adapted to coact with said valve seat when said stem section is reciprocated in one direction relative to said casing, and a sealing member carried by the other stem section adapted to seal the first-named aperture when said stem section is reciprocated in said direction relative to said casing.

JAMES W. DAWSON.